US011858163B2

(12) United States Patent
Peeters

(10) Patent No.: US 11,858,163 B2
(45) Date of Patent: Jan. 2, 2024

(54) METHOD OF MAKING A SLEEVE FOR COVERING RECEPTACLE, AND APPARATUS FOR MAKING THE SLEEVE

(71) Applicant: Fuji Seal International, Inc., Osaka (JP)

(72) Inventor: Joop Michael Petrus Peeters, Db Deurne (NL)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 17/910,015

(22) PCT Filed: Mar. 25, 2021

(86) PCT No.: PCT/IB2021/052487
§ 371 (c)(1),
(2) Date: Sep. 8, 2022

(87) PCT Pub. No.: WO2021/198861
PCT Pub. Date: Oct. 7, 2021

(65) Prior Publication Data
US 2023/0109957 A1  Apr. 13, 2023

(30) Foreign Application Priority Data

Mar. 30, 2020 (LU) ........................................ 101715

(51) Int. Cl.
*B26F 1/00* (2006.01)
(52) U.S. Cl.
CPC ................................. *B26F 1/0015* (2013.01)

(58) Field of Classification Search
CPC ........ B26F 1/0015; B65B 13/02; B65B 13/04
USPC ............................................................. 83/30
See application file for complete search history.

(56) References Cited

U.S. PATENT DOCUMENTS

| 4,441,395 | A  | * | 4/1984  | McRoskey    | B26F 1/0015 83/862 |
| 5,001,956 | A  | * | 3/1991  | Nitsch      | B26F 1/0015 83/695 |
| 2001/0002563 | A1 | * | 6/2001  | Sigwart     | B26F 1/36 83/13 |
| 2005/0051009 | A1 | * | 3/2005  | Sanderson   | B21D 28/28 83/401 |
| 2009/0056277 | A1 | * | 3/2009  | Weder       | B65D 85/505 53/399 |
| 2009/0254062 | A1 | * | 10/2009 | McGlothlin  | B26F 1/0015 83/13 |
| 2013/0061559 | A1 | * | 3/2013  | Van Rijsewijk | B65B 9/14 53/381.5 |
| 2013/0138077 | A1 | * | 5/2013  | O'Day       | A61M 25/0015 83/866 |
| 2014/0013907 | A1 | * | 1/2014  | Kalbacher   | B26F 1/0015 83/660 |

(Continued)

*Primary Examiner* — Omar Flores Sanchez
(74) *Attorney, Agent, or Firm* — Locke Lord LLP

(57) ABSTRACT

Disclosed is a method of making a shrink label for covering a receptacle having a protrusion, from a strip of flexible tubular material, wherein the shrink label has a given length measured from a first end to a second end, being measured in the longitudinal direction of the strip, the method having at least the step of: puncturing the strip to form a puncture being spaced apart from the first end and from the second end, wherein the puncture suits the shape of the protrusion.

16 Claims, 11 Drawing Sheets

(56) References Cited

U.S. PATENT DOCUMENTS

Figure 1:
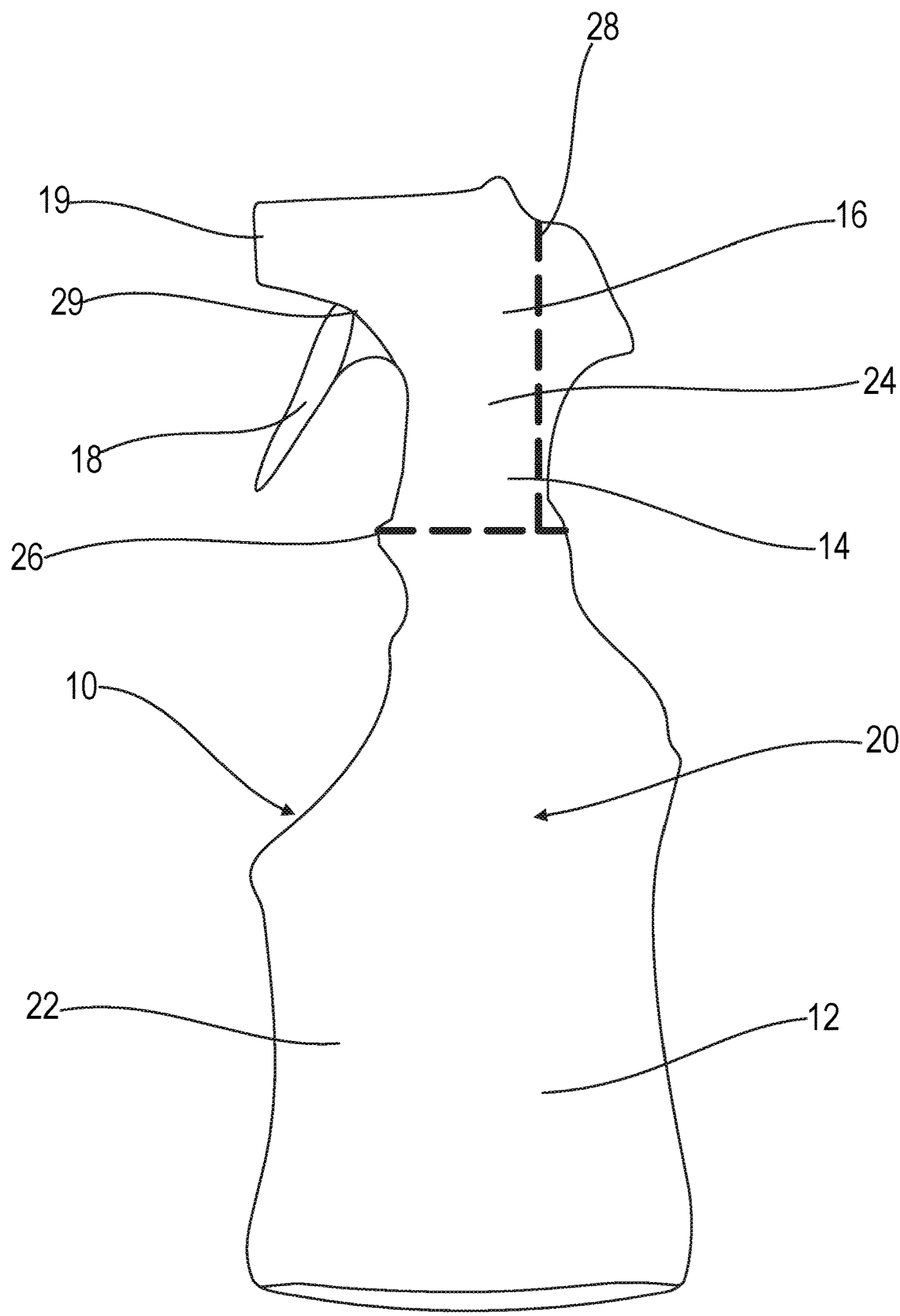

| | | | |
|---|---|---|---|
| 2014/0360904 A1* | 12/2014 | Aya | B65B 13/32 |
| | | | 53/399 |
| 2019/0217979 A1* | 7/2019 | Ribi | B65D 71/50 |
| 2019/0218010 A1* | 7/2019 | Coules | B65D 77/003 |
| 2020/0269011 A1* | 8/2020 | Carlsson | A61M 27/00 |
| 2022/0106067 A1* | 4/2022 | Hamano | B65B 13/186 |
| 2022/0411113 A1* | 12/2022 | Armeni | B65B 35/40 |

* cited by examiner

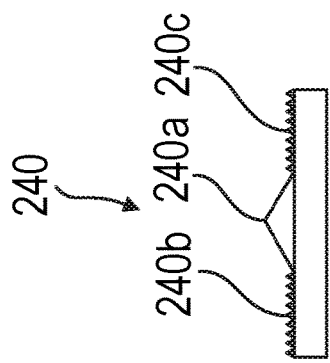
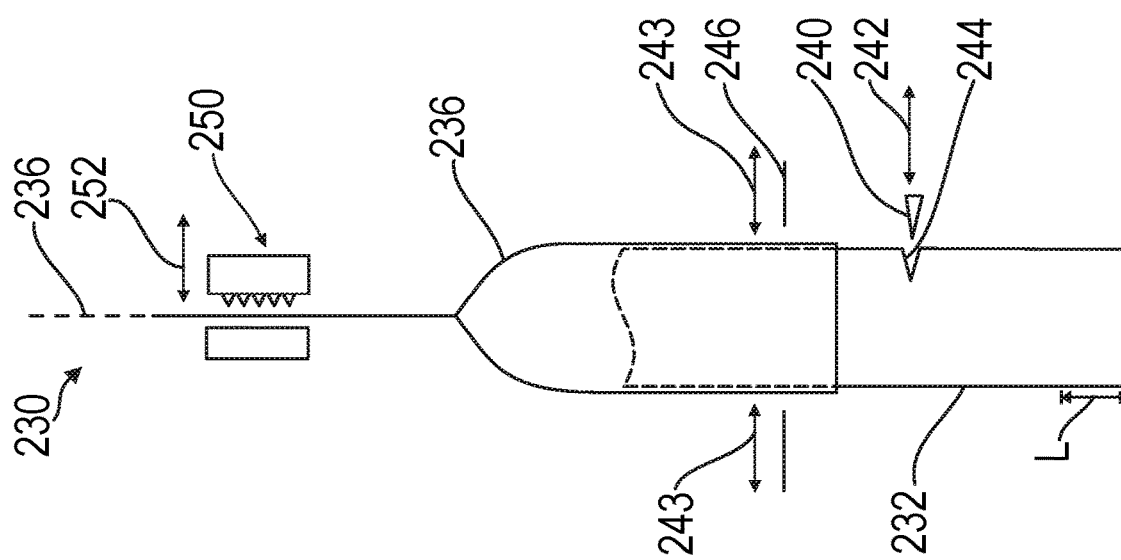
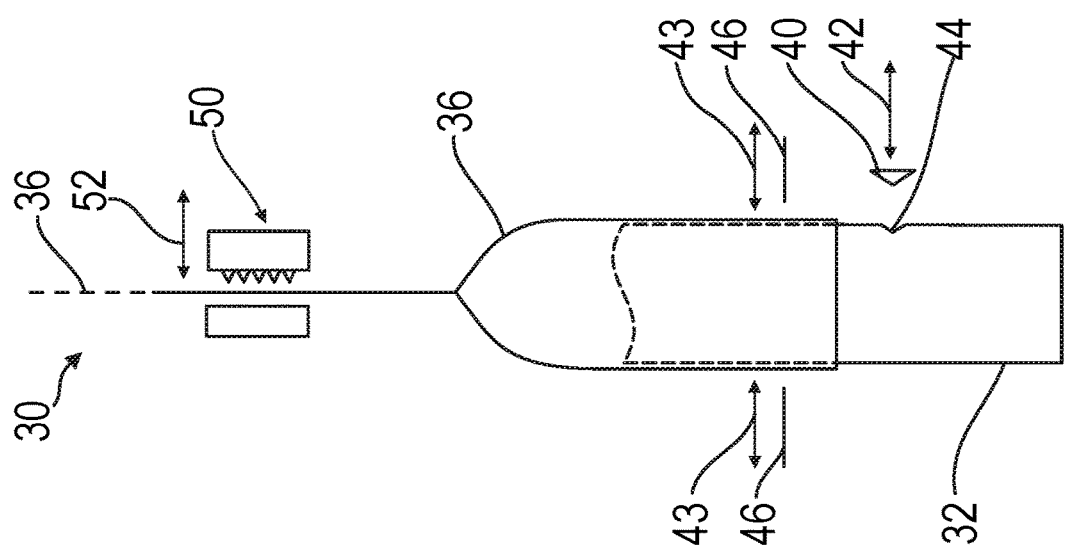

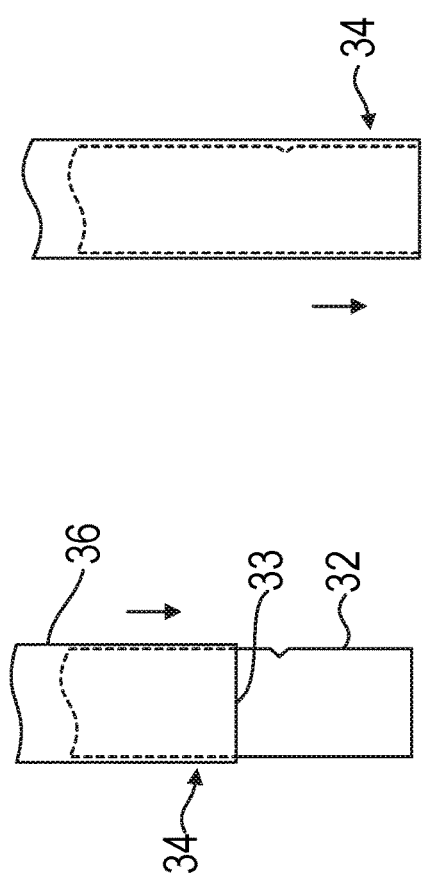
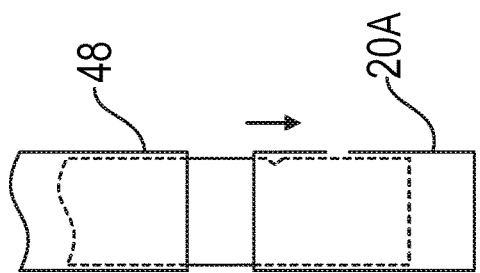
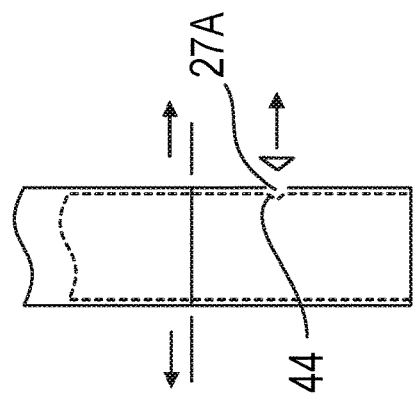
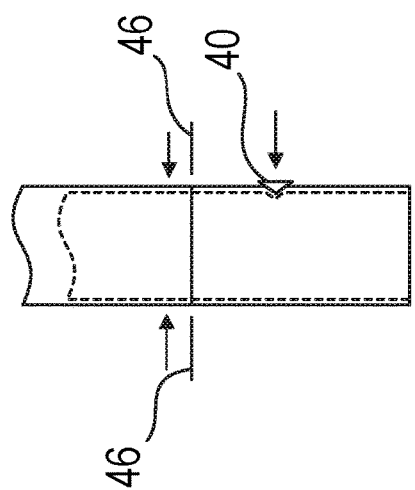

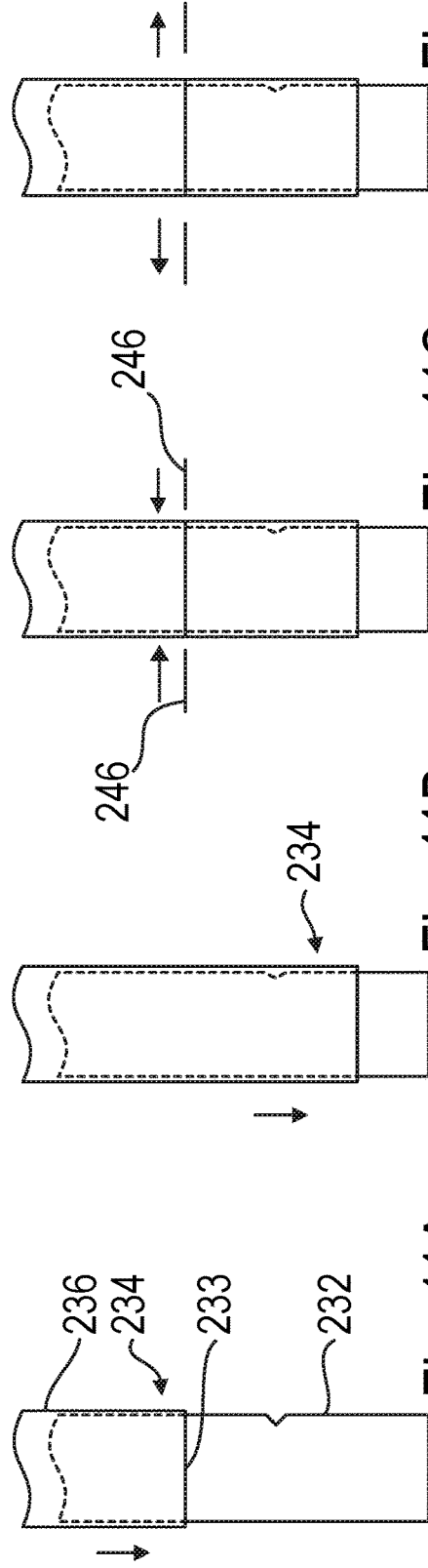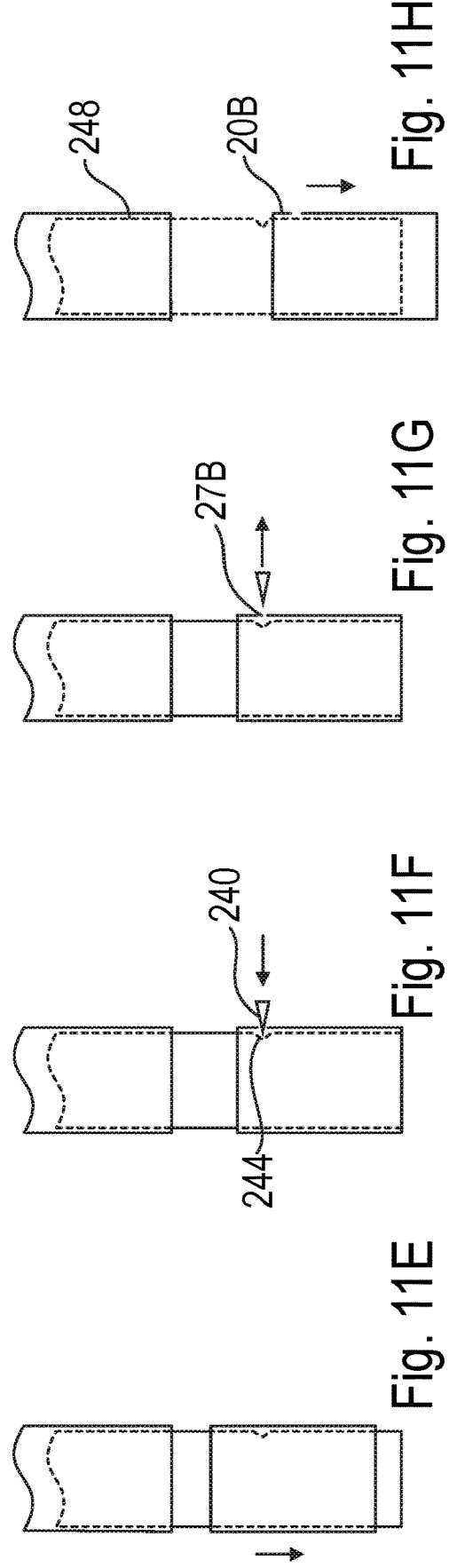

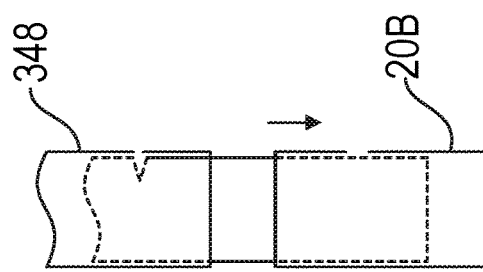
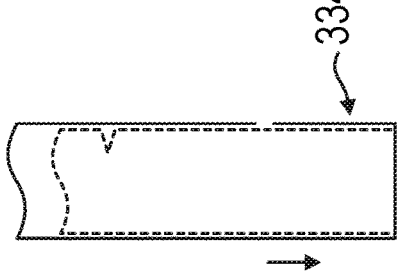
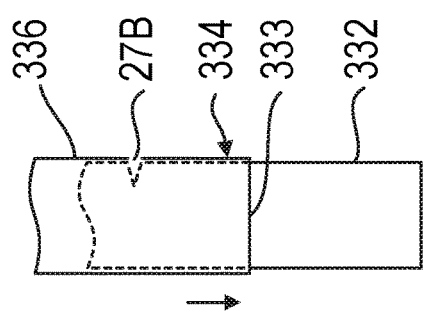
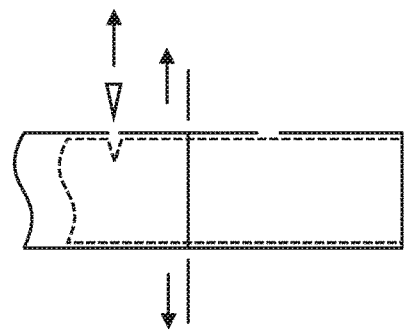
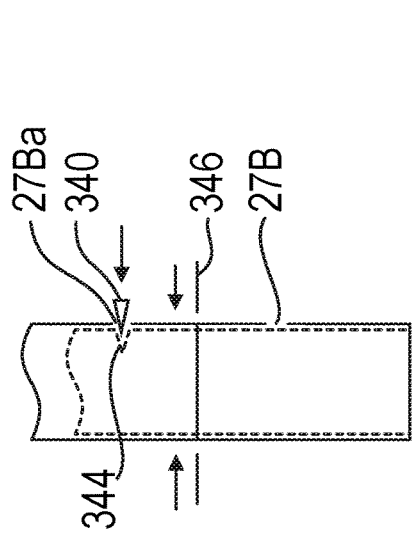

METHOD OF MAKING A SLEEVE FOR COVERING RECEPTACLE, AND APPARATUS FOR MAKING THE SLEEVE

TECHNICAL FIELD

The present invention relates to a method of making a sleeve for covering a receptacle and an apparatus for making the sleeve.

BACKGROUND ART

Containers such as bottles can have shrink labels attached thereon in order to display product names or the like and achieve decorative effects. For instance, a typical bottle may have a body that is configured to hold a product, such as a liquid, within an interior space of the body. The bottle may then have an opening to dispense product through the opening and a cap threadably coupled with the body to selectively close the opening of the bottle. In some other versions, the cap comprises a trigger and a nozzle to allow a user to squeeze the trigger to dispense the product within the bottle through the nozzle of the cap. In yet other versions the cap may comprise a plunger-type pump dispenser having a nozzle. A shrink label is typically applied to the bottle such that a top end of the shrink label is positioned just below the bottom of the cap such that the cap of the bottle is exposed.

US2013/0061559A1 discloses a device for arranging a sleeve-like foil envelope around an object. The foil material is made of a so-called shrink material which shrinks as a result of heat being applied and which forms with a close fit to the shape of the bottle or container around which the sleeve-like envelope has been arranged.

SUMMARY OF THE INVENTION

The inventors have found that during shipping of the bottle, the cap may become loose relative to the bottle causing the product from the bottle to leak through the opening. It may therefore be desirable to provide a shrink label that further secures a cap relative to a bottle to prevent the cap from becoming loose relative to the bottle. This may thereby prevent a product from leaking from the bottle during shipping.

In other words there is a desire for a shrink label that further secures a cap relative to a bottle to prevent the cap from becoming loose relative to the bottle. This may thereby hinder a product from leaking from the bottle during shipping. Such a shrink label could be provided that extends upward from the bottle and onto a portion of the cap. The shrink label can thereby be (e.g. heat) shrunk onto the bottle and the cap to further secure the cap relative to the bottle and prevent the cap from loosening relative to the bottle during shipping. But this arrangement still leaves room for improvement with regards to hindering leakage. Correspondingly objects apply generally to sleeves for covering a receptacle, a shrink label being a type of sleeve.

It is an object of the invention to achieve a way to make a sleeve for covering a receptacle hinder leakage of receptacle contents particularly reliably. The object is achieved by the subject-matter of each independent claim. Advantageous further developments are laid out in the dependent claims.

According to the invention, a method of making a sleeve for covering a receptacle, from a strip of flexible tubular material, wherein the sleeve has a given length measured from a first end to a second end, being measured in the longitudinal direction of the strip, comprises: puncturing the sleeve or the strip to form a puncture being spaced apart from the first end and from the second end.

So by making a puncture in the sleeve or the strip the protrusion of a receptacle can be inserted through the puncture. The puncture can be made in the strip or sleeve, both of which are tubular, i.e. after the material is formed as a tube. This allows higher production efficiency compared to, for example puncturing a non-tubular strip for each sleeve, the tube being subsequently bonded at its ends to form a tube. The sleeve is more robust. The shape of the puncture may be chosen to suit the shape of the protrusion. For example the puncture may have one or both of longitudinal and transverse extent. When the protrusion is a trigger, undesired actuation causing leakage can be reduced. When the protrusion is a handle, the sleeve can interfere less with the handle. By spacing the puncture from the sleeve ends, each sleeve end portion comprising a sleeve end is not punctured by making the puncture (there is a puncture-free region on either longitudinal end/extent of the puncture); so the sleeve can better hinder loosening of any cap; when the receptacle has a nozzle, the sleeve can better hinder leakage from the nozzle. Even if the sleeve does not cover the nozzle, the nozzle as a protrusion can protrude through the slit so the sleeve is not excessively deformed or ruptured. The sleeve can hinder loosening (e.g. rotation and/or extension) of the cap and optionally any nozzle provided on it.

The sleeve may be made by removing a length of tubular material from the strip. So the strip may have greater length than the given length of the sleeve, i.e. the strip of flexible tubular material may be long enough for several sleeves to be made (e.g. removed) from it. Puncturing the sleeve may therefore be understood to mean puncturing a length of tubular material separated from the strip; alternatively or in addition said length may be understood as an as-yet-unpunctured sleeve. Alternatively the strip may have the same length as the sleeve.

Said puncturing may be done at a first distance from the free end.

The sleeve may be cut from the (e.g. punctured) strip having greater length than the given length of the sleeve, such as a greater length before cutting the strip. So the production of multiple sleeves is facilitated.

The method may comprise: feeding the strip, a free end of the strip (such as a flat strip) being fed first, to an opening device, the opening device receiving the strip. So the strip is tubular even before it is fed.

The method may comprise: opening, by an opening device, a region of the strip by separating opposing inner peripheral portions of the strip.

The method may comprise cutting the free-end portion from the strip at a second distance from its free end, the second distance being greater than the first distance.

It may be provided that cutting the strip (such as cutting the free-end portion) is done by cutting the strip at the open region.

Said puncturing the sleeve or the strip may be puncturing the sleeve (such as puncturing the sleeve opened or held open by the opening device). So the sleeve is punctured after being cut from the strip.

It may be provided that after said cutting the sleeve from the strip, the sleeve is moved apart from the rest of the strip before said puncturing the sleeve (such as moved in the feeding/longitudinal direction).

Said puncturing the sleeve or the strip may be puncturing the strip, such as puncturing the open region of the strip.

So by puncturing an open region, the strip can be more easily and accurately punctured in the wall thickness direction. Making an even number of punctures, a single puncture, or an odd number of punctures is facilitated in particular compared to a case of puncturing a strip where it is supported on rollers in its flattened state. This facilitates puncturing from the outer periphery to the inner periphery, without puncturing from the inner periphery to the outer periphery, of the strip. The strip may be (partially) flat or (partially) open where the opening device receives it. Opening a region of the strip by separating opposing inner peripheral portions of the strip may comprise further opening a region of the strip by further separating (and/or reducing contact between) opposing inner peripheral portions of the strip.

The opening device may hold open any or both of the open region of the strip and an open region of the sleeve.

The opening device may comprise a mandrel.

Said puncturing the sleeve or the strip may be puncturing the strip, and after said puncturing, the strip may be moved in a feeding direction before said cutting the sleeve from the strip.

Said puncturing (of the sleeve or strip, as the case may be) may be performed upstream or downstream of the cutting in the feeding direction the strip.

Said cutting and said puncturing may be performed at least partially simultaneously. The cutting may be performed at least partially before and/or at least partially after the puncturing. A feeding step may be interposed between these.

Said puncturing the sleeve or the strip may performed on a flat region of the sleeve or strip, as the case may be. In this way it is easier to form two punctures in a single puncturing step. This is useful when covering a container having two protrusions, such as a container having a T-shaped handle/plunger. Nonetheless is still possible to form a single puncture when the puncture coincides with only one folded edge of the flattened material.

The method may comprise forming at least one perforation line (in the sleeve) in addition to making (providing) the puncture, and/or said perforation line not comprising the puncture. The sleeve can be more easily removed by hand. It may be provided that the perforation line is separate from the puncture such as longitudinally and/or peripherally spaced from the puncture.

The at least one perforation line may include a peripheral perforation line extending in a peripheral direction of the strip, preferably being closer to a sleeve end than the puncture is. An end portion of the sleeve can be more easily removed by hand.

The at least one perforation line may include a longitudinal perforation line extending along the longitudinal direction.

The puncture may be formed by a (or may comprise a) slit-like opening. When the puncture is a slit no material need be removed by the puncturing. The puncture may be a cutout such as a partial cutout. The puncture may be a single slit or single cutout.

The puncture may have a central portion formed by a (or comprising a) slit-like opening, Preferably at least one end portion formed by (or comprising) perforations extends from the central portion.

The puncture may extend in the longitudinal direction.

The puncture may extend in a transverse direction, The transverse direction may be understood to be transverse to the longitudinal direction.

The puncture may extend at most partially around the sleeve. So for example when the puncture extends in the transverse direction, the puncture is not so long that its ends meet. Therefore any extent of the puncture in a transverse direction, being a direction perpendicular to the longitudinal direction, may be less than the circumference of the sleeve.

Said puncturing may be understood to be puncturing transversely to the longitudinal direction. So the puncturing movement is transverse to the longitudinal direction.

At least a part of the (e.g. longitudinally extending) puncture may coincide in the longitudinal direction with, and be peripherally spaced from, the longitudinal perforation line. So a portion of the sleeve in the vicinity of the puncture can be easily removed by hand.

A longitudinal perforation line may join with the peripheral perforation line. When the user breaks one of the peripheral and longitudinal perforation lines, it is easier to break the other of the peripheral and longitudinal perforation lines.

It may be provided that the peripheral perforation line does not intersect the puncture. Removal of an entire peripheral portion of the sleeve is facilitated.

The perforation line may be configured to remain closed (e.g. to not form openings) even when the sleeve is shrunk around a receptacle. So the shrinking and sealing performance of the sleeve is maintained.

The perforation line may comprise one or more pairs of parallel perforation lines.

The method may comprise a subsequent step of transferring the sleeve having the puncture from the opening device and optionally fitting it over a receptacle, while optionally feeding the strip for making the next sleeve.

An embodiment of the invention which may be combined with any of the configurations described above is: a method of making a sleeve for covering a receptacle, from a strip of flexible tubular material, wherein the sleeve has a given length measured from a first end to a second end, being measured in the longitudinal direction of the strip, and comprises: puncturing the sleeve or the strip transversely to the longitudinal direction to form a longitudinally extending puncture being spaced apart from the first end and from the second end. The method may comprise: feeding the strip, a free end of the strip being fed first, to an opening device, the opening device receiving the strip; and preferably opening, by an opening device, a region of the strip by separating opposing inner peripheral portions of the strip; and puncturing the strip by puncturing the open region of the strip.

According to the invention, an apparatus for making a sleeve for covering a receptacle, from a strip of flexible tubular material, in particular for making the sleeve according to a method according to the invention, wherein the sleeve has a given length measured from a first end to a second end, being measured in the longitudinal direction of the strip, comprises a puncturing means configured to puncture the sleeve or the strip to form a puncture being spaced apart from the ends of the sleeve.

The apparatus may comprise an opening device for receiving a given length of the strip fed to the opening device, a free end of the strip being fed first, to open a region of the strip by separating opposing inner peripheral portions of the strip. The puncturing means may be configured to puncture the open region of strip or sleeve. The puncturing means may comprise a blade or several blades spaced apart.

The opening device may comprise a recess configured to receive the puncturing means. The recess may be configured so that the puncturing means does not contact the opening device.

The apparatus may comprise a cutting means configured to cut the sleeve from the strip, the strip having greater length that the given length of the sleeve.

The apparatus may comprise a perforation means configured to form at least one perforation line, the at least one perforation line being in addition to the puncture (so does not comprise the puncture). The perforation line may be longitudinally and/or peripherally spaced from the puncture.

The apparatus may be configured to perform the method.

An apparatus according to the invention may be embodied as follows: an apparatus for making a sleeve for covering a receptacle, in particular for making the sleeve according to the method, wherein the sleeve is made from a strip of flexible tubular material and has a given length measured from a first end to a second end, being measured in the longitudinal direction of the strip, comprises: an opening device for receiving a given length of the strip fed to the opening device, a free end of the strip being fed first, to open a region of the strip by separating opposing inner peripheral portions of the strip, and further comprises a puncturing means configured to puncture the open region of the sleeve or the strip transversely to the longitudinal direction to form a longitudinally extending puncture being spaced apart from the ends of the sleeve.

SHORT DESCRIPTION OF THE FIGURES

Figure 2:
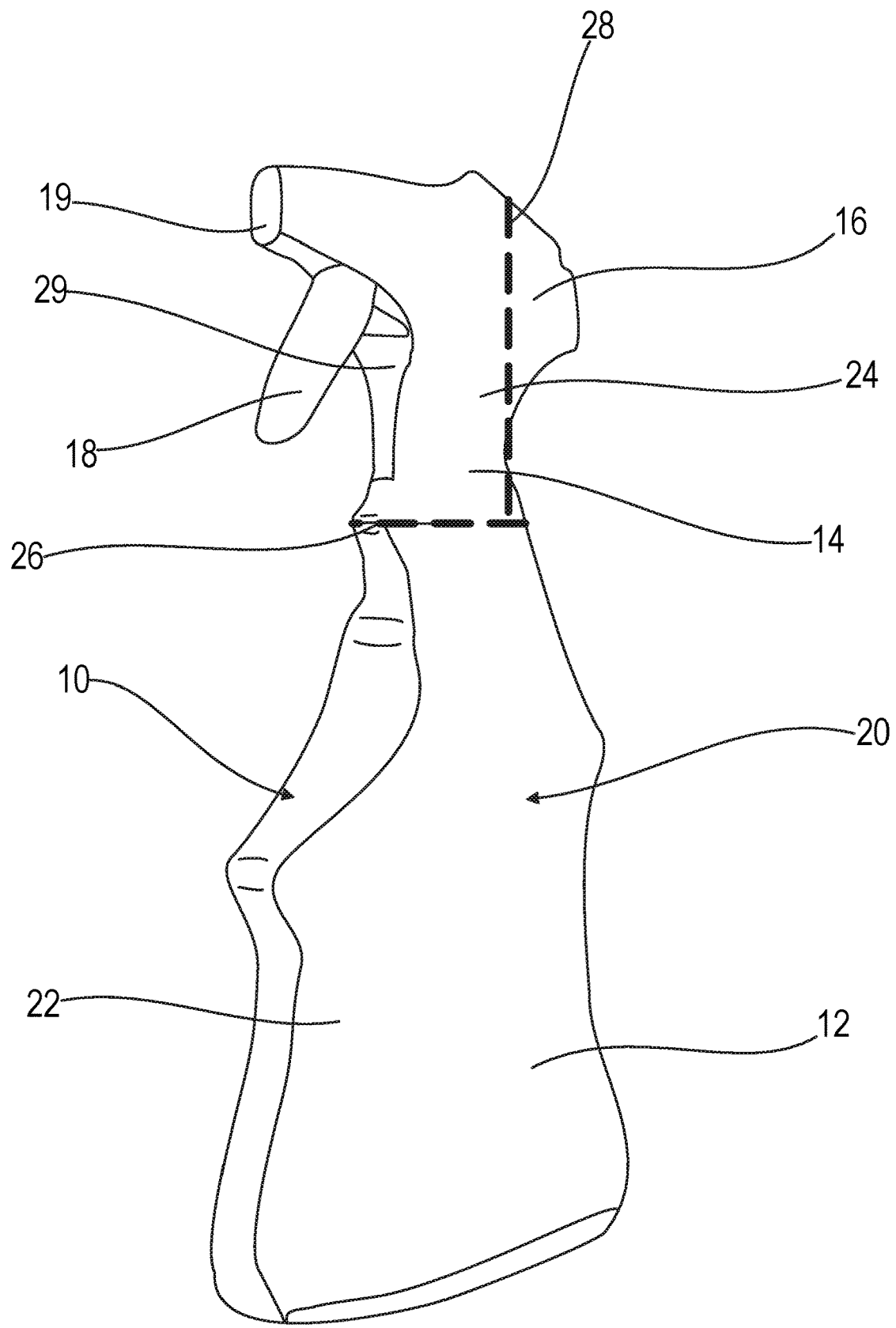
Figure 3:
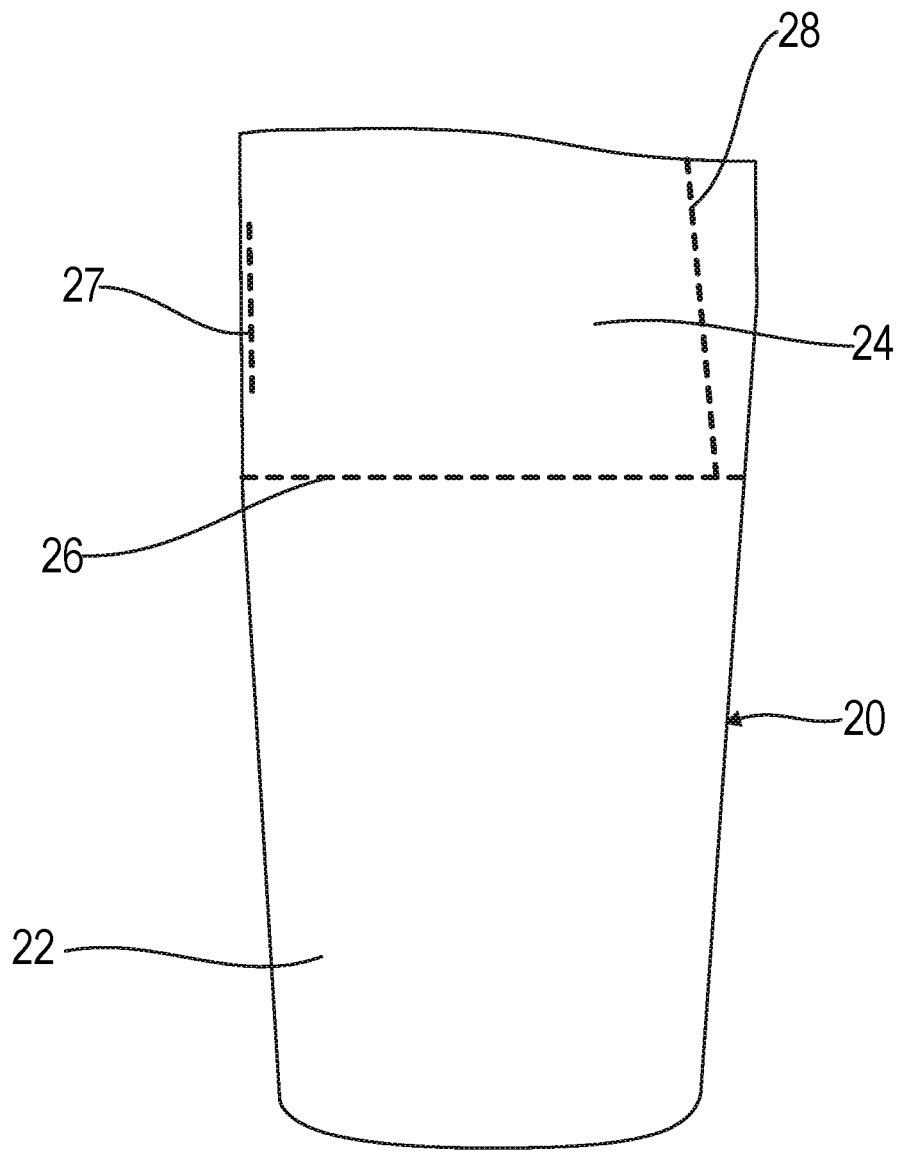
Figure 4:
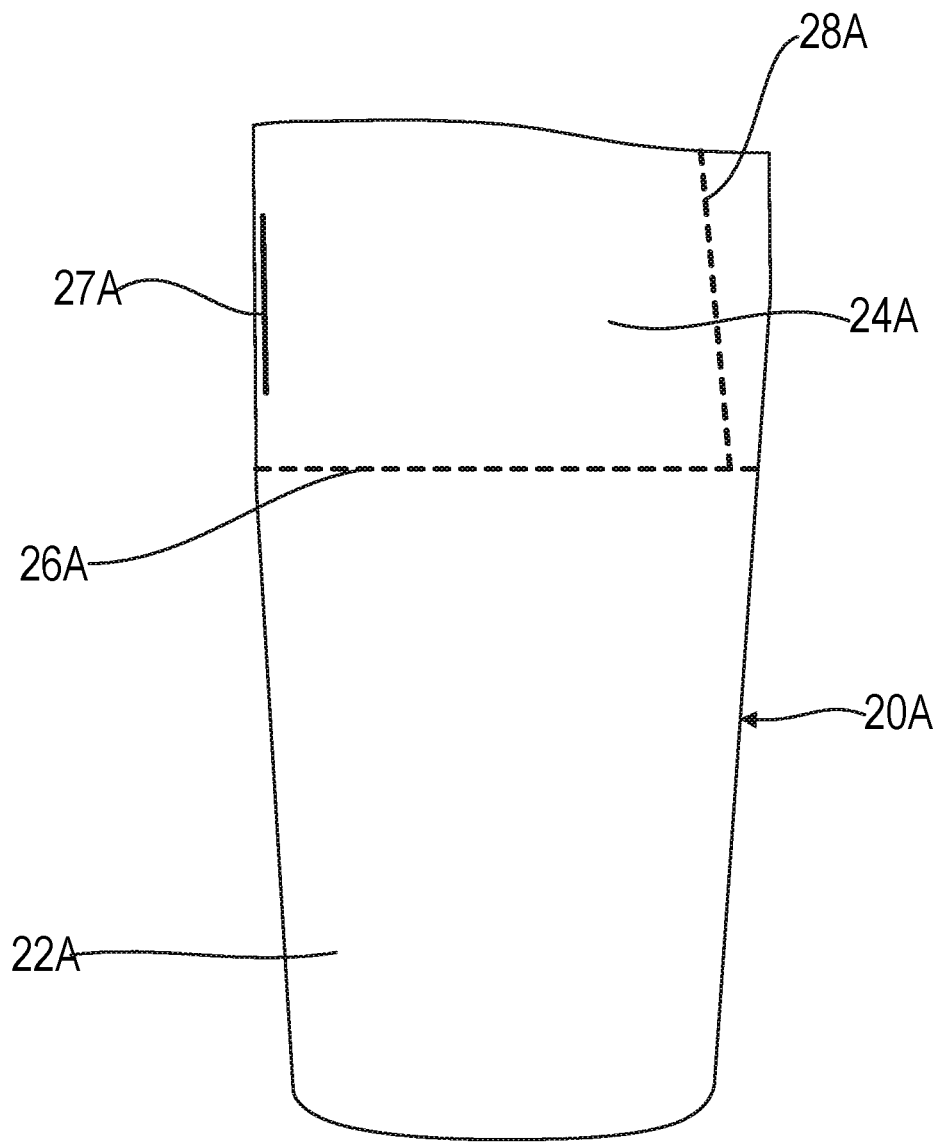
Figure 5:
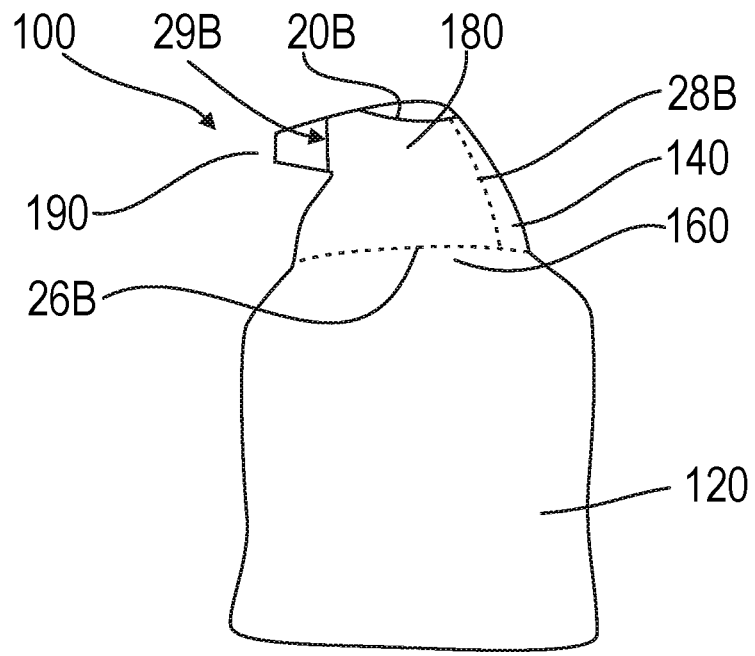
Figure 6:
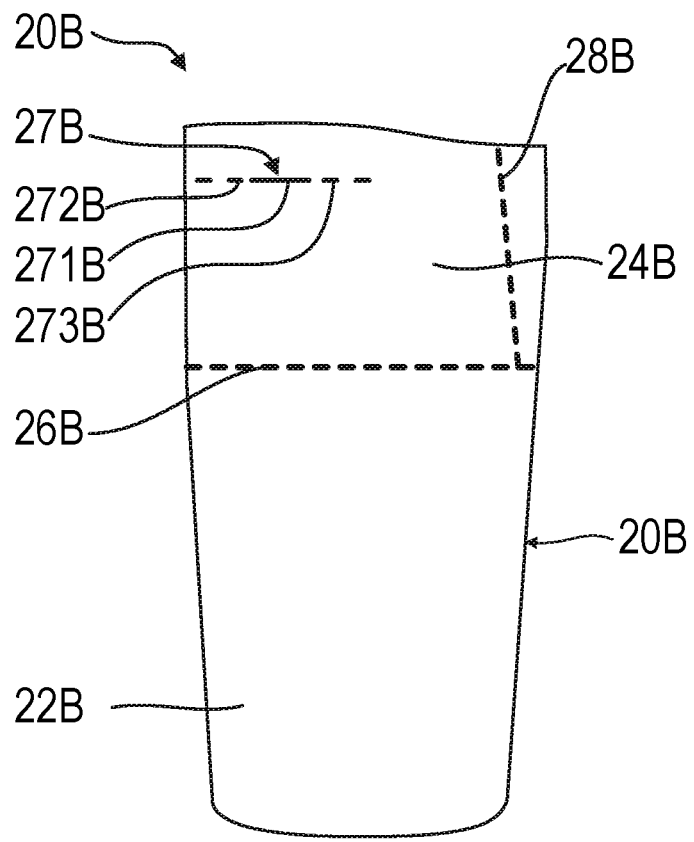

Preferred embodiments are described in more detail in the following with the help of the appended figures, wherein:

FIG. 1 depicts a side elevational view of a receptacle assembly having a first shrink label made according to embodiments of to the invention, FIG. 2 depicts a perspective view of the receptacle assembly of FIG. 1, FIG. 3 depicts a side elevational view of a first shrink label for the receptacle assembly, in an open configuration prior to shrinking, FIG. 4 depicts a side elevational view of a second shrink label for the receptacle assembly, made by a method and apparatus according to a first embodiment of the invention, in an open configuration prior to shrinking, FIG. 5 depicts a side elevational view of another receptacle assembly having a third shrink label made by a method and apparatus according to embodiments of the invention, FIG. 6 depicts a side elevational view of the third shrink label, in an open configuration prior to shrinking, FIG. 7 schematically shows an apparatus according to the first embodiment, which is for making the second shrink label, FIG. 8 schematically shows an apparatus according to a second embodiment of the invention, which is for making the third shrink label, FIG. 9 schematically shows a puncturing means used in the apparatus according to the second embodiment, FIGS. 10A to 10E show a method according to the first embodiment.

Figure 12:
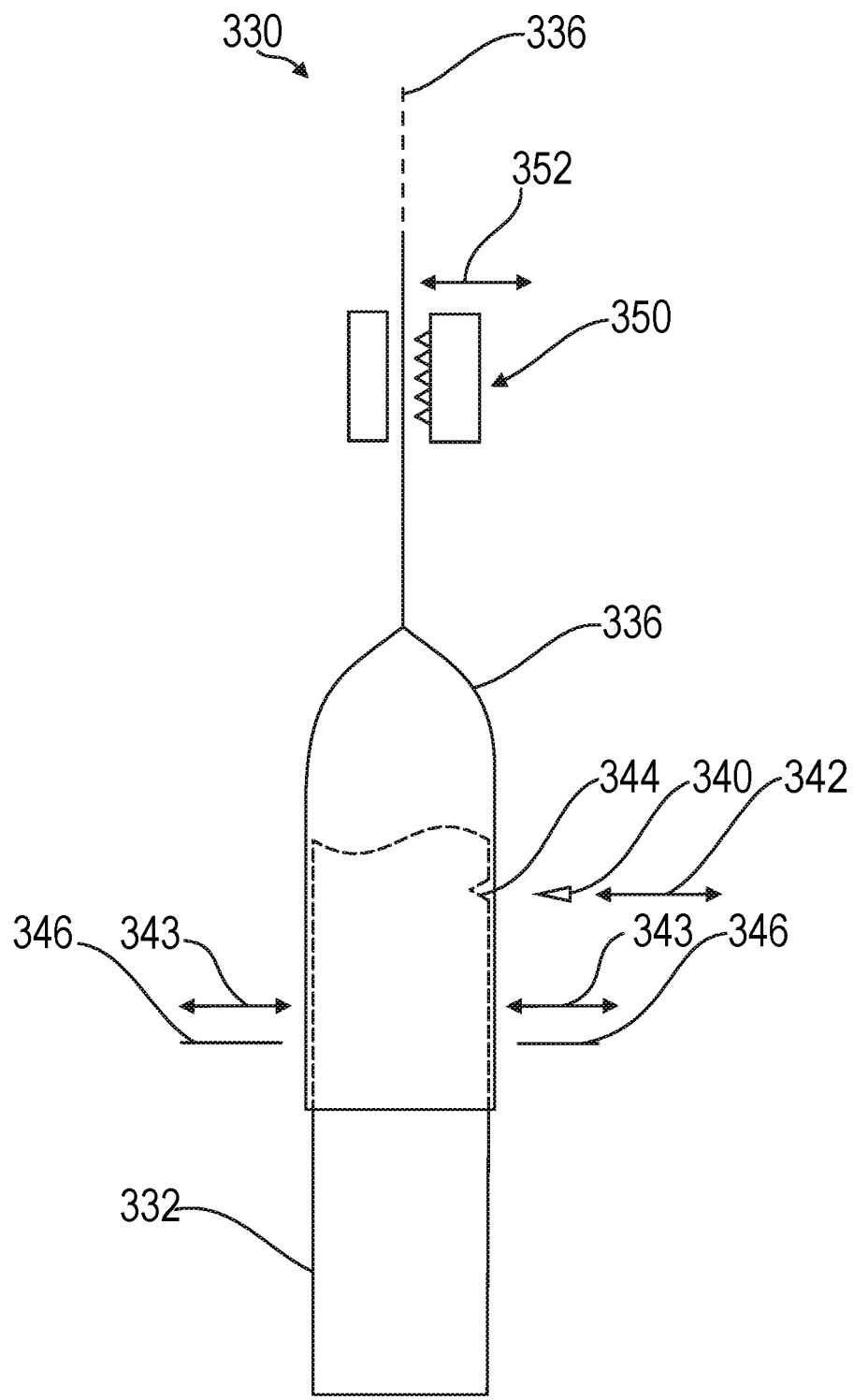
Figure 14:
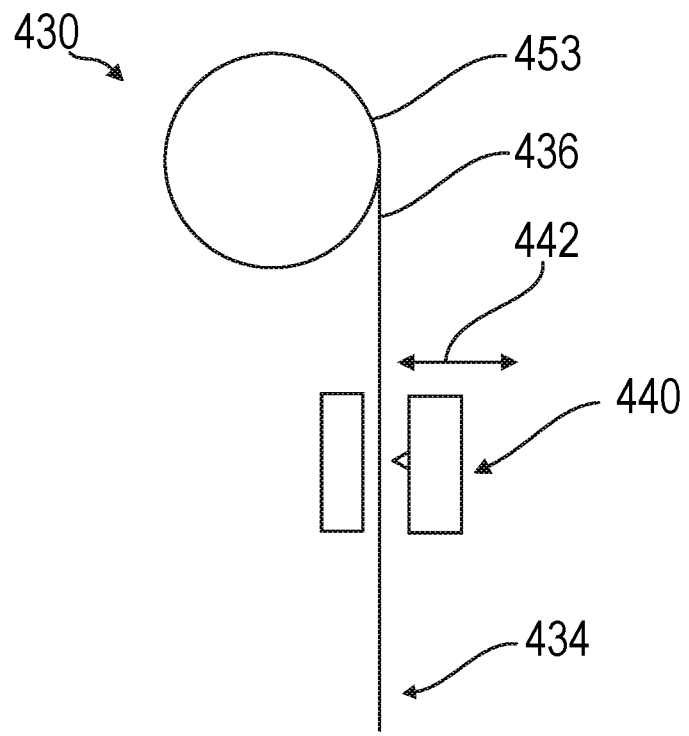
Figure 15:
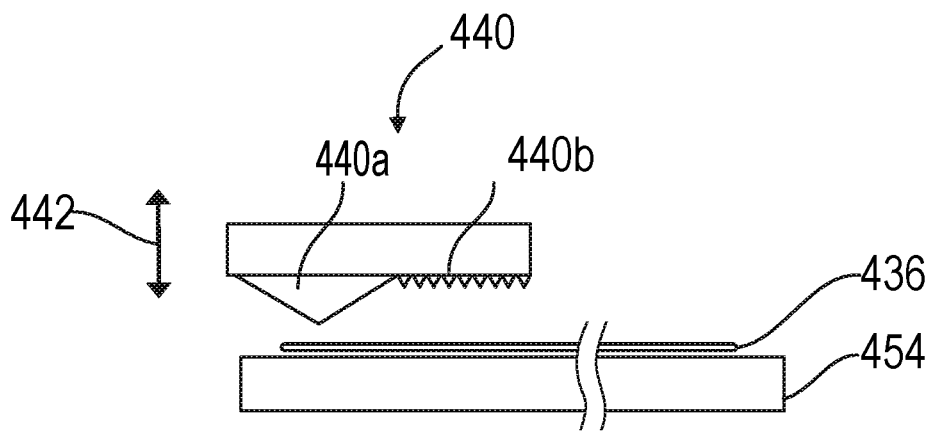

FIGS. 11A to 11H show a method according to the second embodiment,

FIG. 12 schematically shows an apparatus according to a third embodiment of the invention, which is for making the third shrink label, FIGS. 13A to 13E show a method according to the third embodiment, FIG. 14 shows an apparatus according to a fourth embodiment of the invention, which is for making the third shrink label, and FIG. 15 shows a detailed view of the apparatus according to the fourth embodiment.

Similar or functionally equivalent features are provided in the figures with corresponding reference signs.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION OF PREFERRED EMBODIMENTS

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. Various suitable ways in which the teachings herein may be combined will be readily apparent to those of ordinary skill in the art in view of the teachings herein. Such modifications and variations are intended to be included within the scope of the claims.

First Shrink Label

FIGS. 1 and 2 show views of a receptacle assembly having a first shrink label made according to embodiments of the invention.

Referring to FIGS. 1 and 2, a shrink label 20 is shown attached to a bottle 10. In the illustrated embodiment, bottle 10 includes a body 12 defining an interior space for storing product. A top end portion of body 12 includes a neck 14 having an opening (not shown) to provide access to the product within body 12. Neck 14 is threadably coupled with cap 16. In some other versions, cap 16 may be coupled with bottle 10 using other suitable configurations, such as a snap fit, a friction fit, a living hinge, etc. Cap 16 includes a trigger 18 and a nozzle 19 such that a user may squeeze trigger 18 to pivot trigger 18 inwardly towards bottle 10 to thereby dispense the product within body 12 through nozzle 19.

Shrink label 20 is shown positioned about bottle 10. Shrink label 20 may comprise any suitable plastic material that is configured to shrink and thereby form to bottle 10 when heated. Shrink label 10 comprises a lower portion 22 and an upper portion 24 separated by a first perforation line 26. Lower portion 22 of shrink label 20 thereby extends below first perforation line 26 to cover at least a portion of body 12 of bottle 10. Lower portion 22 may have a length of about 182 mm and a width of about 184 mm, but any other suitable dimensions may be used. In the illustrated embodiment, lower portion 22 extends to a bottom end portion of bottle 10. In some other versions, lower portion 22 only extends to cover a portion of body 12. Upper portion 24 of shrink label 20 extends above first perforation line 26 to cover at least a portion of cap 16 of bottle 10. Upper portion 24 may have a length of about 101 mm and a width of about 184 mm, but any other suitable dimensions may be used. In the illustrated embodiment, upper portion 24 extends to a top end portion of cap 16 such that upper portion 24 is configured to enclose nozzle 19. In some other versions, upper portion 24 only extends to cover a portion of cap 16.

First perforation line 26 is positioned to extend circumferentially about shrink label 20 near neck 14 of bottle 10. In the illustrated embodiment, first perforation line 26 is positioned just below neck 14, but in other versions first perforation line 26 may be positioned at or above neck 14. First perforation line 26 also extends continuously about the entire circumference of shrink label 20. In some other versions, first perforation line 26 extends about only a portion of shrink label 20. Shrink label 10 further comprises one or more second perforation lines 28 extending transversely relative to first perforation line 26, through upper portion 24 of shrink label 20, from first perforation line 26 to a top portion of bottle 10. As shown in FIG. 3, second perforation line 28 may be oriented obliquely relative to first perforation line 26 in an open configuration such that second perforation line 28 is oriented substantially vertical after shrink label 20 has been applied to bottle 10, as shown in FIGS. 1 and 2. First and second perforation lines 26, 28 thereby allow a user to remove upper portion 24 of shrink label 20 prior to use of bottle 10.

Referring to FIGS. 1 and 2, shrink label 20 further comprises an opening 29 extending through upper portion 24 to allow trigger 18 of bottle 10 to be exposed through opening 29. Referring to FIG. 3, shrink label 20 has a third perforation line 27 extending along upper portion 24 transverse to first perforation line 26. In the illustrated embodiment, third perforation line 27 extends along only a portion of upper portion 24 such that third perforation line 27 is positioned above first perforation line 26 and below a top end surface of upper portion 24. Third perforation line 27 may have a length of about 55 mm, and be positioned about 16 mm above first perforation line 26 and about 30 mm below the top end surface of shrink label 20, but any other suitable dimensions can be used. The length of third perforation line 27 thereby generally corresponds to the length of trigger 18, but any other suitable lengths can be used. Third perforation line 27 is formed such that third perforation line 27 is configured to rip more easily than First and second perforation lines 26, 28. Accordingly, when shrink label 20 is heated and shrunk about bottle 10 to form to bottle 10, third perforation line 27 breaks along third perforation line 27 to form opening 29. Trigger 18 of bottle 10 can thereby extend through opening 29. Additionally or alternatively, third perforation line 27 may be formed as a slit instead of perforations such that the slit is configured to expand as shrink label 20 is applied to bottle 10. Still other suitable configurations for third perforation line 27 will be apparent to one with ordinary skill in the art in view of the teachings herein.

Use of First Shrink Label

FIG. 3 shows the shrink label 20 of the receptacle assembly described above in an expanded (i.e. not shrunk) configuration. A use of the shrink label 20 to cover a bottle, thus forming the receptacle assembly of FIG. 1, is described in the following.

To apply shrink label 20 to bottle 10, bottle 10 may be positioned within shrink label 20 in an open configuration, as shown in FIG. 3. For instance, body 12 of bottle 10 may be aligned with lower portion 22 of shrink label 20, neck 14 of bottle 10 may be aligned near first perforation line 26 of shrink label 20, and cap 16 of bottle may be aligned with upper portion 24 of shrink label 20 to position trigger 18 adjacent with third perforation line 27. Energy such as heat may then be applied to shrink label 20 such that shrink label 20 shrinks to form to bottle 10, as shown in FIGS. 1 and 2. As shrink label 20 forms to bottle 10, third perforation line 27 breaks apart to form opening 29 to allow trigger 18 to extend through opening 29 while enclosing nozzle 19. Shrink label 20 thereby holds the position of the cap 16 relative to the bottle 10 to further secure the cap 16 with the bottle 10. This prevents the cap 16 from rotating and/or loosening relative to the bottle 10 to prevent product from leaking from the bottle 10. Opening 29 of shrink label 20 may also inhibit shrink label 20 from incidentally leaking product during the heat shrink process. For instance, as shrink label 20 is applied to bottle 10, compressive forces from shrink label 20 may pivot trigger 18 to incidentally leak product from bottle 10. Opening 29 thereby allows trigger 18 to extend through opening 29 to inhibit shrink label 20 from pivoting trigger 18 and incidentally leaking product.

A user may then pull downward on upper portion 24 of shrink label 20 to break upper portion 24 along second perforation line 28 down to first perforation line 26. Upper portion 24 of shrink label 20 can then be ripped along first perforation line 26 to remove upper portion 24 of shrink label 20 from bottle 10. Cap 16 may thereby be exposed to allow product to be dispensed from the bottle 10. Still other suitable configurations for shrink label 20 will be apparent to one with ordinary skill in the art in view of the teachings herein. For instance, in some versions, shrink label 20 may comprise a pull-tab to aid in removing a portion of the shrink label 20.

Second Shrink Label

A second shrink label made according to a first embodiment of the invention is shown in FIG. 4 and differs from the first shrink label 20 in the following. The second shrink label 20A has a single slit 27A instead of the third perforation line 27. In this case it is not necessary to break apart any perforation line to form the opening 29. When the shrink label shrinks (e.g. upon applying energy such as heat) and/or when the trigger penetrates the slit, the slit widens to form the opening 29 having smooth sides.

The slit 27A and above-mentioned third perforation line 27 are each examples of a puncture. The puncture may extend along any or both of: at least parts of the upper portion 24, and at least parts of the lower portion 22. The puncture may extend at least partially longitudinally.

The first 26A and second 28A perforation lines correspond to the perforation lines 26 and 28 of the first shrink label 20.

The shrink label 20A can be used in place of the shrink label 20 for covering the bottle 10.

Third Shrink Label

FIG. 5 shows a view of another receptacle assembly, which has a third shrink label made according to embodiments according to the invention. FIG. 6 shows the shrink label 20B for the receptacle assembly of FIG. 5 in an expanded (i.e. not shrunk) configuration.

Referring to FIG. 5, a shrink label 20B is shown attached to a bottle 100 including a body 120 defining an interior space for storing product. A cap 160 is fixed to an opening in a neck 140 of the bottle at the top of the bottle, such as by screwing, snap fit, a friction fit, a living hinge, etc. Cap 160 includes a pump mechanism which has a plunger 180 and a nozzle 19. A user can push down on the plunger 180 to dispense product within body 120 through nozzle 190.

Shrink label 20B is shown positioned about bottle 100. The shrink label 20B may be made from the same materials as the first 20 and second 20A shrink labels. Shrink label 10 comprises a lower portion 22B and an upper portion 24B separated by a first perforation line 26B. Lower portion 22B of shrink label 20B thereby extends below first perforation line 26B to cover at least a portion of body 120 of bottle 100. Lower portion 22B extends to a bottom end portion of bottle 100. In some other versions, lower portion 22B only extends to cover a portion of body 120. Upper portion 24B of shrink label 200 extends above first perforation line 26B to cover at least a portion of cap 160 of bottle 100. Upper portion 24B extends to a top end portion of cap 160.

First perforation line 26B is positioned to extend circumferentially about shrink label 20B near neck 140 of bottle 100. First perforation line 26B is positioned just below neck 140, but in other versions first perforation line 26B may be positioned at or above neck 140. First perforation line 26B also extends continuously about the entire circumference of shrink label 20B. In some other versions, first perforation line 26B extends about only a portion of shrink label 20B. Shrink label 100 further comprises one or more second perforation lines 28B extending transversely relative to first perforation line 26B, through upper portion 24B of shrink label 20B, from first perforation line 26B to a top portion of bottle 100. First and second perforation lines 26B, 28B correspond to the first 26, 26A and second perforation lines 28, 28A of the first 20 and second 20A shrink labels. They equally allow a user to remove upper portion 24B of shrink label 20B prior to use of bottle 100.

Referring to FIGS. 5 and 6, shrink label 20B further comprises an opening 29B extending through upper portion 24B to allow nozzle 190 of bottle 100 to be exposed through opening 29B. Referring to FIG. 6, shrink label 20B has a puncture 27B extending along upper portion 24B parallel to first perforation line 26B. The puncture comprises a central portion 271B formed as a (non-perforated) slit, and a respective perforated portion 272B, 273B on either side of the central portion 271B. The central portion 271B may directly join and/or be aligned with the perforated portions 272B, 273B. Puncture 27B extends along only a portion of upper portion 24B and puncture 27B is positioned above first perforation line 26B and below a top end surface of upper portion 24B. The width of puncture 27B thereby generally corresponds to the width of the nozzle 190, but any other suitable lengths can be used. Puncture 27B is configured to rip more easily than first and second perforation lines 26B, 28B. Accordingly, when shrink label 20B is heated and shrunk about bottle 100 to form to bottle 100, puncture 27B breaks at its perforated portions 272B, 272C to form opening 29B. Nozzle 190 can thereby extend through opening 29B. Additionally or alternatively, puncture 27B may be formed entirely as a slit. Still other suitable configurations for puncture 27B will be apparent to one with ordinary skill in the art in view of the teachings herein. In typical examples the puncture 27B is positioned closer to one end of the shrink label than the punctures 27 and 27A are.

Use of Third Shrink Label

A use of the shrink label 20B to cover a bottle, thus forming the receptacle assembly of FIG. 5, is described in the following.

To apply shrink label 20B to bottle 100, bottle 100 may be positioned within shrink label 20B in an open configuration, as shown in FIG. 6. For instance, body 120 of bottle 100 may be aligned with lower portion 22B of shrink label 20B, neck 140 of bottle 100 may be aligned near first perforation line 26B of shrink label 20B, and cap 160 of bottle may be aligned with upper portion 24B of shrink label 20B to position nozzle 190 adjacent with puncture 27B. Energy such as heat may then be applied to shrink label 20B such that shrink label 20B shrinks to form to bottle 100, as shown in FIGS. 5 and 6. As shrink label 20B forms to bottle 100, the perforated end portions 272B, 273B of the puncture 27B break apart to form opening 29B wider than the central portion 271B, to allow nozzle 190 to extend through opening 29B. Shrink label 20B thereby holds the position of the cap 160 relative to the bottle 100 to further secure the cap 160 with the bottle 100, especially because the shrink label 20B has unpunctured regions above and below the nozzle 190. This more securely hinders the cap 160 from rotating and/or loosening relative to the bottle 100 to hinder product from leaking from the bottle 100. The shrink label 20B may function also as a tamper-evident seal.

A user may then pull downward on upper portion 24B of shrink label 20B to break upper portion 24B along second perforation line 28B down to first perforation line 26B. Upper portion 24B of shrink label 20B can then be ripped along first perforation line 26B to remove upper portion 24B of shrink label 20B from bottle 100. Cap 160 may thereby be exposed to allow the user to twist the cap 160, thus activating the spring-loaded plunger by first extending it; by pushing on the extended plunger product can be dispensed from the bottle 100. Still other suitable configurations for shrink label 20B will be apparent to one with ordinary skill in the art in view of the teachings herein. For instance, in some versions, shrink label 20B may comprise a pull-tab to aid in removing a portion of the shrink label 20B.

So a shrink label for application to a bottle, comprises a lower portion and an upper portion, wherein the lower portion is configured to be applied to at least a portion of a body of the bottle, wherein the upper portion is configured to be applied to at least a portion of a cap of the bottle, wherein the upper portion comprises a puncture such as a perforation line extending along a portion of the upper portion, wherein the puncture is configured to expand when the shrink label is applied to the bottle to form an opening, wherein a protrusion of the cap such as a trigger or a nozzle is positioned to extend through the opening.

So a method of applying a shrink label to a bottle, wherein the bottle comprises a body and a cap having a protrusion such as a trigger or a nozzle, comprises a lower portion and an upper portion having a puncture extending along a portion of the upper portion, the method comprising the steps of: positioning the shrink label about the body such that the lower portion of the shrink label is aligned with at least a portion of the body and the upper portion of the shrink label is aligned with at least a portion of the cap, wherein the puncture is positioned adjacent to the protrusion; applying heat to the shrink label to form the shrink label to the bottle; expanding the puncture to form an opening in the shrink label; and positioning the protrusion through the opening.

In the case that any or both of the first 26A and second 28A perforation lines may be omitted, even here the following advantages can still be achieved: the trigger is positioned through the opening, reducing leakage through an undesired trigger actuation; the nozzle is covered by the shrink label, further reducing leakage; the shrink label covers (is shrunk around) at least part of the cap and at least part of the body with a close fit, reducing undesired loosening of the cap; this hinders leakage; the shrink label has a larger surface area (advantageously a large design area can be implemented). The compound slit 27B may be replaced with a puncture comprising only a transverse slit or only a transverse perforation.

First Embodiment—Apparatus

In the following an apparatus according to a first embodiment is described. The apparatus is for making the second shrink label 20A. As shown schematically in FIG. 7, the apparatus 30 comprises a mandrel 32 configured to receive a continuous strip 36 of flexible tubular material. The mandrel 32 is essentially columnar and has a vertical and stationary longitudinal axis. A top portion (not shown) of the mandrel 32 has a spreading element known in the art which can convert a strip of flexible tubular material from a flat form to an open form. The lower portion of the mandrel is shown in FIG. 7 and has a circular section. In variants of the present embodiment the mandrel may have any one or more of a circular, oval, polygonal and plate-like section. The strip 36 can be introduced to the mandrel 32 from a roll (not shown) which is prepared in advance. The lower portion of the mandrel may be formed from a sleeve shot part of the mandrel.

The apparatus 30 comprises advancing means which are known in the art and not shown, for feeding the strip 36. The advancing means may comprise one or more first pairs of rollers which engage with the inner and outer faces of the wall of the strip 36. In this way the strip 36 can be fed onto the mandrel 32 from the mandrel's upper end. The advancing means may comprise one or more second pairs of rollers which engage with the inner and outer faces of the wall of the strip 36 at a lower position on the mandrel 32 than the first pairs of rollers. In this way a sleeve cut from the strip 36 can be fed from the lower end of the mandrel to another production station. One or more of the rollers may be driven by an electric motor. One roller in each pair of rollers may be accommodated in recesses (not shown) provided in the mandrel 32. The mandrel 32 may be supported by some of the rollers.

The apparatus 30 comprises a slitting blade 40, as a puncturing means, driven by a puncturing mechanism (not shown). More specifically, the mechanism moves the blade 40 toward and away from the mandrel in the radial directions shown by the double-headed arrow 42. In the present embodiment the movement is linear but in other embodiments the movement may comprise any or more of a linear, circular, and elliptical motion. For example the blade 40 may rotate about an axis: specifically the blade 40 may be a rotating (spinning) blade whose cutting profile is eccentric to its axis of rotation. The movement allows the blade 40 to penetrate the strip 36 to make a slit in a region of the strip 36. The motion of the blade 40 may be driven any one or more of: electrically, pneumatically, and hydraulically. For example the blade 40 may be driven by an electric motor such as a servomotor. In a preferable embodiment the blade 40 is driven by a reciprocating pneumatic actuator. The blade 40 punctures the wall-thickness of the shrink label 20A from one (outer) side while the mandrel 32 (opening device) supports the strip 36 from the other (inner) side. The slit is preferably straight and/or longitudinal. The slit may have a length (longitudinal extent) greater than or equal to any of: 2 mm, 5 mm, 10 mm, 15 mm, 20 mm, 25 mm, and 55 mm.

The blade 40 in the present embodiment has a triangular shaped profile. The blade profile may alternatively comprise a plurality of triangular shapes arranged in a vertical line. The leading vertex of the triangular shape may have an angle of 45 degrees. The blade 40 is configured to create a continuous slit of predetermined length in the strip 36. By providing more than one triangular shape, such as a sawtooth like profile, the required stroke of the blade 40 for a given slit length can be kept short.

The mandrel 32 comprises a recess 44 on its surface for receiving the blade 40. The blade 40 can enter the recess 44 which is shaped in correspondence with the triangular profile of the blade 40. The recess may have other shapes, such as a straight or circular shape, and may extend in a peripheral direction at least partly around the mandrel 32. The recess 44 may be a through-hole. The recess may be configured so that the puncturing means 40 does not contact the mandrel 32.

The apparatus 30 comprises a rotary cutter 46, as a cutting means, comprising one or more blades that can move toward and away from the mandrel in the radial directions shown by the double-headed arrow 43 so as to cut the strip 36 peripherally, above the blade 40. A rotary cutter known in the art can be used here. The rotary cutter 46 may be configured to make a peripheral cut at least partly during the puncturing of the strip 36.

The assembly 30 has a perforation means 50, comprising perforating blades, for making the first and second perforation lines. The perforation means 50 may comprise a respective perforating blade or blades for each perforation line and/or it may comprise a common perforating blade. The perforation means 50 is configured to reciprocatingly puncture a portion or portions of the strip 36 upstream of the mandrel 32, the directions of reciprocation being shown by the double-headed arrow 52. The perforation means 50 is thus configured to puncture a flattened portion of the strip 36, for example by applying a perforation means commonly known in the art. The perforation means 50 may be provided downstream of the mandrel.

First Embodiment—Method

In the following a method according to the first embodiment is described. FIGS. 10A to 10E represent procedures of the method which are performed using the apparatus 30 described above and shown in FIG. 7.

Step A: As shown in FIG. 10A a strip 36 of tubular material is fed onto the mandrel 32 from the top portion of the mandrel 32, for example by means of the first roller pairs of the advancing means (not shown). The position in FIG. 10A may be at least partially achieved by cutting and removing a previously made shrink label from the strip 36.

Step B: The strip 36 is fed (such as by continuing the feeding in Step A) until the free end 33 of a free-end portion 34 of the strip 36 reaches a predetermined position along the mandrel 32, such as the bottom end of the mandrel 32 (FIG. 10B). Thus a region of the strip becomes an open region held open and/or supported by the mandrel 32. At this point the feeding is stopped.

Step C: Subsequently a puncturing step is performed (FIG. 10C), wherein the slitting blade 40 penetrates the strip 36 and enters the recess 44. The extents of the puncture 27A may be formed in correspondence with the extents of the blade 40. In other words a longitudinally upper extent of the puncture 27A may be formed by (or in correspondence with) the longitudinally upper extent of the blade 40, and a longitudinally lower extent of the puncture may be formed by (or in correspondence with) the longitudinally lower extent of the blade 40. So the strip 36 is punctured at a first distance from its free end 33. Longitudinal end portions of the sleeve are not punctured in making the puncture. The first distance may be measured as the maximum longitudinal extent of the puncture from the free end.

The strip 36 is cut about its periphery, optionally during the puncturing (FIG. 10C). The rotary cutter 46 may be configured to start and optionally complete the cutting before the puncturing. In this case the blade 40 punctures a shrink label 20A that is already cut from the strip 36. So the strip 36 is cut at a second distance from its free end 33, the second distance being greater than the first distance.

Step D: After cutting, the rotary cutter 46 is retracted. After puncturing, the blade 40 is retracted (see FIG. 10D).

The end portion of the strip 36 forms the end portion of the shrink label 20A. The free end 33 becomes an open end of the shrink label 20A.

In summary of the above the sleeve is made from the strip of tubular material by: feeding a free-end portion of a given length of the strip onto a columnar mandrel; puncturing the free-end portion at a first distance from its free end, transversely to the feeding direction, to form a puncture; and cutting the free-end portion from the strip at a second distance from its free end, the second distance being greater than the first distance.

Step E: Subsequently the shrink label 20A is advanced (FIG. 10E) in the direction of the solid arrow of FIG. 10E by means of the second pairs of rollers so that it leaves the mandrel 32 from the mandrel's bottom end. The not-shown advancing means may transfer the newly-made free-end portion 48 of the strip 36 to the predetermined position at the same time that, or shortly after, the shrink label 20A is transferred from the mandrel 32. Preferably the shrink label 20A is transferred from the mandrel 32 to a receptacle (not shown in FIG. 10A to 10E), which is further preferably positioned under the mandrel 32.

The method comprises a step (not shown in FIGS. 10A to 10E) of perforating a flattened portion of the strip 36, upstream to the mandrel, to form the first 26 and the second 28 perforation lines, by means of the perforation means 50. The first 26 and the second 28 perforation lines are provided on each shrink label 20A.

Because the puncturing is performed on a portion of the strip 36, and the portion is provided on the mandrel 32, accuracy and repeatability are improved. Also the blade 40 is prevented from puncturing the wall of the strip 36 twice, as would be the case if the strip 36 were punctured in a flattened state. Puncturing is performed by moving the blade 40 in a plane parallel to the mandrel axis. So accuracy and repeatability of the puncturing can be further improved. Further preferably the slit (substantially) coincides in the peripheral direction with a longitudinal crease in the tubular material. The crease may be formed when the tubular material is flat. So insertion of a protrusion on a receptacle is facilitated.

By forming the first and second perforation lines on a flattened part of the strip 36 it becomes easy to form pairs of parallel perforations, or to form a peripheral perforation.

Advantageously, by puncturing at the same time as cutting, the processing time can be short. The not-shown advancing means, the blade 40, and the rotary cutter 46 may be configured to cooperate with timed fashion by means of a not-shown control unit.

When the mandrel 32 is arranged with its axis vertical, then the free end 33; longitudinally lower extent of the puncture 27A; longitudinally upper extent of the puncture 27A; and location of cutting are longitudinally spaced from each other in that order. Thus the puncture 27A is surrounded on all its sides by unpunctured material.

The mandrel 32 may be stationary (e.g. rotationally stationary) during the puncturing and/or cutting. The strip 36 may be stationary relative to the mandrel 32 during the puncturing such as at least rotationally stationary. Alternatively or in addition at least parts of the puncturing and the feeding may coincide.

The method may be adapted to make a shrink label made according to the first embodiment by replacing the slitting blade 40 described above with a perforating blade. The sleeve may be punctured more than once and/or have more than one puncture.

The method may be adapted to make a shrink label of any of the modified first and second embodiments described above by omitting perforating the strip 36 with the first 26 and/or the second 28 perforation lines.

Second Embodiment—Apparatus

In the following an apparatus according to a second embodiment of the invention is described, with the help of FIGS. 8 and 9 and by comparison with the apparatus of the first embodiment. As shown schematically in FIG. 8, the apparatus 230 differs from the apparatus 30 of the first embodiment in that the blade 40 of the apparatus 30 is replaced with a blade 240 shown in greater detail in FIG. 9. The apparatus 230 is for making the third shrink label 20B.

The cutting edges of the blade 240 extend transversally to the longitudinal direction. FIG. 9 shows a detail of the blade 240 when the configuration of FIG. 8 is viewed from above. The blade comprises a central portion 240a as a slitting portion, and a respective perforation portion on each side of the central portion. Each perforating portion 240b, 240c comprises a perforating blade adjoining the central portion 240a. So the blade 240 may be described as a compound blade.

The apparatus 230 according to the second embodiment differs from the apparatus 230 of the first embodiment also in that its mandrel 232 is longer than the mandrel 32 of the first embodiment by a length shown as "L" in FIG. 8, and in that it is configured to perform the method of the second embodiment which is described in the following.

Second Embodiment—Method

In the following a method according to the second embodiment is described. The method is for making the third shrink label 20B using the apparatus 230 of the second embodiment. FIGS. 11A to 11H represent stages of the method which is performed using the apparatus 230.

Step A: As shown in FIG. 11A a strip 236 of tubular material is fed onto the mandrel 232 from the top portion of the mandrel 232, for example by means of the (not shown) first roller pairs of the advancing means. The strip may be provided from a roll of tubular material. The strip opens as it passes over the mandrel 232. The position in FIG. 11A may be at least partially achieved by cutting and removing a previously made shrink label from the strip 236.

Step B: The strip 236 is fed (such as by continuing the feeding in Step A) until a free end 233 of a free-end portion 234 of the strip 236 reaches a predetermined position along the mandrel 232, such as a position above the bottom end of the mandrel 232 (FIG. 11B). Thus a region of the strip becomes an open region held open and/or supported by the mandrel 232.

Step C: Subsequently a cutting step is performed (FIG. 11C), wherein the strip 236 is cut about its periphery, in particular without simultaneously performing a puncturing step. So the strip 236 is cut at a second distance from its free end 233 by the rotary cutter (cutting means) 246 which can reciprocate in the direction of the arrows 243.

Step D: After cutting, the rotary cutter 246 is retracted (FIG. 11D). The free-end portion 234 forms an end portion of the shrink label 20B, and. The free end 233 becomes an open end of the shrink label 20B.

Step E: Subsequently, as shown in FIG. 11E, the length of cut strip is advanced (fed) in the direction of the arrow of FIG. 11E by means of further pairs of rollers (not shown) so that it arrives at a puncturing position shown in FIG. 11F. So a length of cut strip (unpunctured shrink label 20B) is fed until the free end 233 of a lower free-end portion 234 of the cut strip reaches a predetermined position along the mandrel 232, such as the bottom end of the mandrel 232. Thus the length of cut strip is held open and/or supported by the mandrel 232. The feeding is stopped.

Step F: Subsequently a puncturing step is performed (FIG. 11F), wherein the blade 240, by moving in the direction of the arrow 242, penetrates the cut strip and enters the recess 244. The extents of the puncture 27B may be formed in correspondence with the extents of the blade 240. In other words a first transverse extent of the puncture 27B may be formed by (or in correspondence with) a first transverse extent of the blade 240, and a second transverse extent of the puncture may be formed by (or in correspondence with) the second transverse extent the blade 240. So the length of cut strip 236 is punctured at a first distance from its free end 233, being less than the second distance. Thus a shrink label 20B is formed. Longitudinal end portions of the shrink label 20B are not punctured in making the puncture. The puncture 27B extends through only a part of the circumference of the shrink label 20B.

In summary of the above the shrink label 20 is made from the strip 236 of tubular material by: feeding a free-end portion 234 of a given length of the strip 236 onto a columnar mandrel 232; cutting the free-end portion 234 from the strip 236 at a second distance from its free end 233; advancing the cut length of strip 236 along the mandrel; and puncturing the cut length of strip at a first distance from its free end 233, to form a puncture 27B, the second distance being greater than the first distance.

Step G: Subsequently the slitting blade 240 is retracted (FIG. 11G).

Step H: Subsequently the shrink label 20B is advanced (FIG. 11H) in the direction of the arrow of FIG. 11H using the advancing means (not shown) so that it leaves the mandrel 232 from the mandrel's bottom end, such as by means of the second roller pairs (not shown). The advancing means may transfer the newly-made free-end portion 248 of the strip 236 to the predetermined position at the same time that, or shortly after, the shrink label 20B is transferred from the mandrel 232. Preferably the shrink label 20B is transferred from the mandrel 232 to a receptacle (not shown in FIGS. 11A to 11H), which is further preferably positioned under the mandrel 232.

The method comprises a step (not shown in FIGS. 11A to 11H) of perforating a flattened portion of the strip 236, upstream from the mandrel 232, to form the first 26B and the second 28B perforation lines on the shrink label 20B, by means of the perforation means 250 reciprocating in the direction of the arrow 252 (shown in FIG. 8).

The method of the second embodiment differs from the method of the first embodiment, for example, in its step (FIG. 11E) of advancing the cut strip along the mandrel 232 between the cutting step and the puncturing step. The length 'L' in FIG. 8 may correspond to the distance of said advancing. By doing so it is possible to puncture the shrink label 20B close to its upper end without having to place the mechanism for the blade 240 so high up on the mandrel 232 that it risks interfering with the rotary cutter 246.

In the case that the cutting step is performed for each shrink label 20B before the puncturing step, this reduces the chance of the presence of the puncture 27B causing tension irregularities, which might lead to problems, in particular at the cutting step. Irregularities in the tension of the strip or shrink label can occur in particular in the case of a transverse puncture, even when a puncturing step does not coincide with a cutting step, and even when the rotary cutter and blade are far away from each other.

Third Embodiment—Apparatus

In the following an apparatus according to a third embodiment of the invention is described by comparison with the apparatus of the first embodiment. As shown schematically in FIG. 12 the apparatus 330 differs from the apparatus 30 of the first embodiment mainly in the following: The apparatus 330 is for making the third shrink label 20B; instead of the longitudinally aligned blade 40 of the first embodiment, a blade 340 having a shape and orientation corresponding to the compound blade 240 of FIG. 9 is provided. So the cutting edge of the blade 340 extends transversally to the longitudinal direction. The blade 340 is provided above the rotary cutter 346, rather than below the rotary cutter as is the case in the first and second embodiments.

Third Embodiment—Method

In the following a method according to the third embodiment is described. The method is for making the third shrink label 20B. FIGS. 13A to 13E represent stages of the method which are performed using the apparatus 330. The method performs the following steps in a repeated cycle.

Step A: As shown in FIG. 13A a strip 336 of tubular material is fed onto the mandrel 332 from the top portion of the mandrel 332, for example by means of first roller pairs of the advancing means (not shown). The strip 332 may be provided from a roll of tubular material. Optionally the position in FIG. 13A can be at least partially achieved by cutting and removing a previously made shrink label from the strip.

Step B: The strip 336 is fed (such as by continuing the feeding in Step A) until the free end 333 of a free-end portion 334 of the strip 336 reaches a predetermined position along the mandrel 332, such as the bottom end of the mandrel 332 (FIG. 13B). Thus a region of the strip 336 becomes an open region held open and/or supported by the mandrel 332. The strip 336 has a puncture 27B created in a puncturing step of a previous operation cycle.

Step C: Subsequently a puncturing step is performed (FIG. 13C), wherein the compound blade 340, by reciprocating in the direction of the arrow 342 (FIG. 12), penetrates the strip 336 and enters the recess 344, producing a puncture 27B. The extents of the puncture 27Ba may be formed in correspondence with the extents of the blade 340. In other words one transverse extent of the puncture 27Ba may be formed by (or in correspondence with) the transverse extent of the blade 340, and the other transverse extent of the puncture 27Ba may be formed by (or in correspondence with) the other transverse extent of the blade 340. Unpunctured portions of the strip 336 extend from the extents of the puncture 27Ba in the circumferential direction.

The strip 336 is cut about its periphery, optionally during the puncturing (FIG. 13C). The rotary cutter 346 may be configured to start and optionally complete the cutting before the puncturing of the same step. For example the blade 40 punctures the length cut from the strip 336. So the strip 336 is cut at a second distance from its free end 333 by the rotary cutter 346 which can reciprocate in the direction of the arrows 343 (FIG. 12). The strip 336 is punctured above the cut, to form the puncture 27Ba in the following shrink label.

Step D: The rotary cutter 346 is retracted. The blade 340 is retracted (see FIG. 13D). The free-end portion 334 of the strip 336 forms an end portion of the shrink label 20B. The free end 333 becomes an open end of the shrink label 20B.

Step E: Subsequently the shrink label 20B is advanced (FIG. 13E) in the direction of the arrow of FIG. 13E so that it leaves the mandrel 332 from the mandrel's bottom end, such as by means of the second roller pairs of the advancing means (not shown). The advancing means may transfer the newly-made free-end portion 348 of the strip 336 to the predetermined position at the same time that, or shortly after, the shrink label 20B is transferred from the mandrel 332. Preferably the shrink label 20B is transferred from the mandrel 332 to a receptacle (not shown in FIG. 13A to 13E), which is further preferably positioned under the mandrel 332.

A subsequent shrink label 20B can be made from the remaining strip of tubular material 336. In this case its puncture 27Ba has already been made in the puncturing step (FIG. 13C) described above.

Since the method comprises performing the above steps in a repeated cycle, the shrink label 20B is cut to length by the cutting of one cycle, and punctured by the puncturing of a previous cycle.

In summary the shrink label 20B is made from the strip of tubular material 336 by: feeding a free-end portion 334 of a given length of the strip onto a columnar mandrel 332; puncturing the free-end portion 334 at a first distance from the strip's free end 333, feeding the strip 336 further along the mandrel 332, and cutting the free-end portion 334 at a second distance from the strip's free end 333, the second distance being greater than the first distance. The blade 340 may be provided upstream of the rotary cutter 346, with respect to the feeding direction.

The method comprises a step (not shown in FIGS. 13A to 13E) of perforating a flattened portion of the strip 336, upstream from the mandrel 332, to form the first 26B and the second 28B perforation lines on the shrink label 20B, by means of the perforation means 350 reciprocating in the direction of the arrow 352.

When the blade 340 is provided above (upstream of) the rotary cutter 346, this can be advantageous when the space below (downstream of) the rotary cutter 346 is limited. It is easier to make a puncture 27B closer to one end (e.g. the top end) of the shrink label 20B compared to an arrangement wherein the blade 340 is placed downstream from, and in particular close to, the rotary cutter 346.

In FIGS. 7, 8, 10A to 10E, 11A to 11H, 12 and 13A to 13E, the parts of the mandrel that are surrounded by the strip are shown with broken lines.

Fourth Embodiment—Apparatus

In the following an apparatus according to a fourth embodiment is described. The apparatus 430 is for making the third shrink label 20B. As shown schematically in FIGS. 14 and 15, a flat portion of a strip 436 of tubular material provided from a roll 453 of tubular material is fed to a blade 440, a free end portion 434 of the strip being fed first. The apparatus 430 is configured to control the feeding of the flattened strip 436 to the blade 440 (the feeding direction being downward in FIG. 14). A view taken along the feeding direction of the apparatus 430 of FIG. 14 is shown in FIG. 15. The transversely extending blade 440 has a slitting portion 440a and a perforating portion 440b. The blade 440 is provided on a reciprocating mechanism configured to move the blade in the directions of the arrow 442, so that the blade can pierce and retract from the strip 436. A support member 454 on the opposite side of the strip 436 to the blade 440 is provided to support the strip at least while it is being pierced. The support member may comprise a recess (not shown) for receiving the blade 440.

Fourth Embodiment—Method

In the following a method according to the fourth embodiment is described with reference to FIGS. 14 and 15. The method is for making the third shrink label 20B using the apparatus 430 of the fourth embodiment.

A straight strip 436 of flattened tubular material is provided, preferably by being extended from a roll 453 of the tubular material, and fed (downwards in FIG. 14) past the blade 440 which pierces both walls of the strip 436 in a single movement. The blade 440 pierces one (in particular only one) folded edge of the strip 436. In this way one (in particular only one) puncture 27B is created. So the other folded edge of the strip 436 in a width direction can be left unpunctured. It may be provided that the folded edges of the strip 436 are not punctured during said puncturing, thus creating two separate slits being spaced apart from the first end and from the second end. This can be advantageous when a bottle has two protrusions, with one protrusion to be inserted in each slit, such as in the case of a pump dispenser comprising a T-shaped plunger handle.

The feeding of the strip 436 is preferably stopped when the puncturing is being performed. By alternating the puncturing steps with feeding steps, several evenly spaced punctures 20B can be formed in the strip 436.

In a subsequent and not-shown step the strip 436 is cut to form a shrink label 20B. Preferably said cutting is performed by feeding the strip 436 to an opening means, such as a mandrel known in the art, to cut the strip into several lengths, each length comprising one puncture 27B, thus creating several opened shrink labels 20B. A rotary cutter such as the rotary cutter 46, 246, 346 of one of the preceding embodiments may be used here; a cutter other than a rotary cutter may be used.

The method comprises a step (not shown in FIGS. 14 and 15) of perforating a flattened portion of the strip 436, upstream or downstream from the puncturing, to form the first 26B and the second 28B perforation lines, by means of a perforation means corresponding to the perforation means 50, 250, 350 of the previously described embodiments. The first 26B and the second 28B perforation lines are provided on each shrink label 20B. The perforation means and the blade 440 may be driven by a common mechanism.

Instead of a linearly reciprocating blade 440, the blade 440 may be provided on the periphery of a rotating wheel, the apparatus being configured to control the speed of rotation. A plurality of blades 440 may be arranged on the periphery of the wheel.

The shrink label may be placed over the receptacle in accordance with the use described above. Shrink labels may be formed by sequentially cutting the strip at predetermined intervals. Furthermore a linear series of receptacles can be arranged, each receptacle being sequentially conveyed to a common position for receiving a shrink label. Each receptacle with a shrink label may be conveyed to a processing station (not shown) for shrinking, such as a heater for heat-shrinking. In this way a receptacle assembly is made by performing the method to make a shrink label followed by using the shrink label to cover a receptacle.

The invention is not limited to puncturing at the mandrel and the puncturing means may be provided at any place where the flexible tubular material is open (e.g. unflattenned), or where the flexible tubular material is flat. Any opening may be performed by an opening device executed as a mandrel or in addition to a mandrel. The opening device may comprise a guide such as a plate-like guide, a guide of varying cross-section, or any a structural member that supports the inside of the strip. Alternatively or in addition the opening device may comprise a tunnel or passageway aligned in a feeding direction and having one or more porous inner surfaces connected to a vacuum; the wall of the strip is thus pulled apart by low air pressure as the strip is received by the opening device; the porous surfaces may be stationary or conveyable; even here the opening portion is formed by moving apart inner peripheral portions of the strip. At least part of the open portion of the strip may be spaced from the opening device. Alternatively or in addition the strip may be inflated with internal pressure.

The puncturing means may comprise a punch having a circular, elliptical, or polygonal (e.g. square or rectangular) section. The puncturing may create a cutout as a puncture, such as by removing a portion of the tubular material, or by partially removing the portion so as to leave a flap of material. The puncture may have a predefined (e.g. non-zero) width. Puncturing may be understood to mean making a puncture. It may be provided that a single slit is formed, or multiple slits are formed, by making the puncture.

The method and/or apparatus of the first embodiment may be modified by being provided with a transversely extending blade instead of the longitudinally extending blade 40.

The method and/or apparatus of the first embodiment may be modified by being provided with a compound blade corresponding to the arrangement in FIG. 9, instead of the slitting blade 40.

The method and/or apparatus of the second to fourth embodiments may be modified by being provided with a longitudinally extending blade instead of the transversely extending blade 240, 340, 440.

The method and/or apparatus of the second to fourth embodiments may be modified by being provided with a slitting blade, being an exclusively slitting blade, or a perforating blade being an exclusively perforating blade.

The method and/or apparatus of any of the embodiments described above may be modified by being provided a perforating blade, being an exclusively perforating blade, as the puncturing means.

The method and/or apparatus of any of the embodiments described above may be modified to make the above-described modified shrink label by omitting perforating the strip to make the first 26, 26A, 26B and/or the second 28, 28A, 28B perforation lines.

The method and/or apparatus of any of the embodiments described above may be modified by being providing the perforation means 50, 250, 350 at an open portion of the strip 36, 236, 336.

The method and/or apparatus of any of the embodiments described above, the shrink label 20, 20A, 20B may be punctured more than once and/or have more than one puncture 27, 27A, 27B.

In the first to third embodiments the cutter is provided as a rotary cutter. The invention is not limited to this and the cutter may be provided as a different type of cutter such as a flat cutter. It may be provided that the cutter peripherally cuts a part of the tubular material that is not on the mandrel. For example the part may be upstream or downstream of the mandrel. The cutting means may be configured to cut the strip by peripherally perforating the strip and then tearing the perforation.

In the foregoing embodiments the protrusion is formed as a trigger or nozzle. The protrusion may alternatively or in addition comprise a handle. For example a handle can be grabbed by the user more easily when the handle is not covered or not completely covered by a shrink label. An exposed protrusion may be advantageous for other functional reasons, e.g. to expose a visual mark.

So the sleeve for covering a receptacle is made of flexible tubular material and is in particular made by a method described above, wherein the sleeve has a given length measured from a first end to a second end in a longitudinal direction and may comprise a longitudinally extending puncture; the puncture is spaced apart from the first end and from the second end. The punctured region may be formed by a slit-like opening. The sleeve may comprise least one perforation line in addition to the puncture.

So the use of the sleeve to cover a receptacle, wherein the receptacle comprises a longitudinally extending body and a protrusion extending at least partially transversally to the longitudinal direction, comprises: positioning the sleeve around the receptacle so that the puncture is aligned in the peripheral direction with the protrusion, and shrinking the sleeve around at least a portion of the receptacle to insert the protrusion through an opening formed by the puncture. So because the puncture is aligned with the protrusion, the protrusion extends from the body through the opening formed from the puncture during shrinking. Making a sleeve according to the method followed by the use of the sleeve may be understood to be a method of making and using a sleeve. The opening device, sleeve, and receptacle may be coaxial during at least some steps, such as when positioning the sleeve about the receptacle. Thus the sleeve can be easily positioned about the receptacle at (essentially) the same time that it is transferred from the opening device.

So the receptacle assembly comprises a receptacle and the sleeve, wherein the receptacle has a longitudinally extending body and a protrusion extending at least partially transversally to the longitudinal direction, the sleeve is in a shrunk state and covers at least a portion of the receptacle, and the protrusion extends through an opening formed by the puncture. The receptacle may comprise a body and a cap attached to the body, and further preferably the sleeve in the shrunk state covers at least a portion of the body and at least a portion of the cap. So it is less likely for the cap to unintentionally separate (e.g. unscrew) from the body. The receptacle may have a nozzle, optionally as part of the cap. After shrinking, the perforation line may extend over at least a portion of the cap. Removal of the sleeve near the cap is facilitated. The sleeve in the shrunk state may cover the nozzle. The receptacle assembly may be formed by the aforementioned use.

The shrink label as a sleeve may comprise pages for displaying e.g. a user manual, such as for medicines etc. The sleeve may show a decoration, such as text or a design. The sleeve may have a packaging function. The sleeve may be only locally shrunk, such as for tamper evidence applications. The sleeve may have a single layer or multilayer (e.g. coextruded) composition. The sleeve may be provided as a full label or as a partial label, i.e. that covers only a portion of the receptacle, such as a portion of an upper and/or a portion of a lower part of the receptacle. The tubular material may comprise metal, such as a metal foil. The sleeve may have uniform thickness in a peripheral and/or a longitudinal direction. The tubular material may have, but is not limited to having, a circular or oval section; the tubular material may have a sectional shape conformable to the shape of any opening device or receptacle, with some oversize. The term "tubular" is understood to mean at least having an inner and an outer periphery. The tubular material may be foil-like and/or film-like.

When a first perforation line is provided, it may extend around at least part of the periphery of the shrink label.

The perforation lines and puncture may be sized to be adjacent to the corresponding features on the bottle taking into account a shrinkage of the shrink label. For example the trigger may be arranged to be adjacent to the third perforation line when the shrink label is in the shrunk state.

A portion of the sleeve comprising the puncture and any first and second perforation line may be understood to be a leak protection portion of the sleeve.

The first and second perforation lines are examples of a perforation line that is in addition to the puncture. In particular the first perforation line is an example of a peripheral perforation line; the second perforation line is an example of a longitudinal perforation line. A peripheral perforation line is understood to be a perforation line extending in an at least partially peripheral direction. A longitudinal perforation line is understood to be a perforation line extending in an at least partially longitudinal direction. The third perforation line is an example of a puncture being spaced from the sleeve ends, and may preferably extend at least partially longitudinally along at least parts of the upper portion. It may be understood that, for the case that the sleeve has a perforation line, the perforation line comprising or joining with a puncture spaced from the sleeve ends, the entire perforation line may be spaced from the sleeve ends and/or may extend over only a portion of the sleeve periphery. Such a perforation line may extend longitudinally.

In foregoing embodiments the sleeve is formed as a shrink label. The sleeve may be changeable from an expanded state towards a shrunk state by applying energy, such as by any one or more of: UV-light, infra-red radiation, hot air, and steam. Alternatively or in addition to shrinking the sleeve may be contracted by mechanical fastening (e.g. ties or bands). Alternatively or in addition the sleeve may shrink by means of humidity change or by releasing elastic energy; for example the sleeve as a stretch sleeve may be elastically expanded (expanded state) while being placed over a receptacle, after which the elastic tension is released (shrunk state). This can be done using techniques known in the art, such as by an expandable and hollow transporting mandrel or by radially separable finger members. So the sleeve may be a label such as any or more of: a stretch label, a shrink label, and a shrink sticker.

A bottle is an example of a receptacle which includes a body and may include a cap. Other examples of a receptacle include container, cup, bowl, and pot. The body may have an interior space and may have an opening. A receptacle having a sleeve applied to it may be called a receptacle assembly. The receptacle and receptacle assembly may be empty or may hold a product such as a liquid or a powder.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the claims and is understood not to be limited to the details of structure and operation shown and described in the specification and drawings.

This application is based on a Luxembourg patent application (Luxembourg Patent Application No. LU101715) filed on Mar. 30, 2020, the contents of which are incorporated herein by reference.

REFERENCE SIGNS 10, 100 . . . bottle (receptacle)
12, 120 . . . body
14, 140 . . . neck
16, 160 . . . cap
18, 180 . . . trigger (protrusion)
19, 190 . . . nozzle (protrusion)
20A, 20B . . . shrink label (sleeve)
22, 22A, 22B . . . lower portion
24, 24A, 24B . . . upper portion
26, 26A, 26B . . . first perforation line
27, 27A, 27B, 27Ba . . . third perforation line (puncture)
271B . . . central portion
272B, 273B . . . end portion
28, 28A, 28B . . . second perforation line
29, 29A, 29B . . . opening
30, 230, 330, 430 . . . apparatus
32, 232, 332 . . . mandrel (opening device)
33, 233, 333 . . . free end
34, 234, 334, 434 . . . free-end portion
36, 236, 336, 436 . . . strip of tubular material
40, 240, 340, 440 . . . blade (puncturing means)
240a, 440a . . . slitting portion
240b, 240c, 440b . . . perforating portion
42, 242, 342, 442 . . . arrows indicating movement of blade
43, 243, 343 . . . arrows indicating movement of rotary cutter
44, 244, 344 . . . recess
46, 246, 346 . . . rotary cutter (cutting means)
48, 248, 348 . . . newly-made free-end portion
50, 250, 350 . . . perforation means
52, 252, 352, . . . arrows indicating movement of perforation means
453 . . . roll of tubular material
454 . . . support member

The invention claimed is:

1. A method of making a shrink label for covering a receptacle from a strip of flexible tubular material, wherein the shrink label has a given length measured from a first end to a second end, being measured in the longitudinal direction of the strip, the method comprising:
   puncturing the shrink label or the strip to form a puncture being spaced apart from the first end and from the second end,
   wherein the shrink label is cut from the strip having greater length than the given length of the shrink label, by cutting the strip at an open region,
   wherein after said cutting the shrink label from the strip, the shrink label is moved apart from the rest of the strip before said puncturing the shrink label.

2. The method according to claim 1, wherein said puncturing is performed on a flat region of the shrink label or strip.

3. A method of making a shrink label for covering a receptacle from a strip of flexible tubular material, wherein the shrink label has a given length measured from a first end to a second end, being measured in the longitudinal direction of the strip, the method comprising:

puncturing the shrink label or the strip to form a puncture being spaced apart from the first end and from the second end, providing at least one perforation line in the shrink label, in addition to providing the puncture.

4. The method according to claim 3, wherein the at least one perforation line includes a peripheral perforation line extending in a peripheral direction of the strip.

5. The method according to claim 3, wherein the at least one perforation line includes a longitudinal perforation line extending along the longitudinal direction.

6. The method according to claim 1, wherein the puncture has a central portion formed by a slit, and at least one end portion formed by perforations and extending from the central portion.

7. The method according to claim 3, wherein the puncture extends in the longitudinal direction.

8. The method according to claim 3, wherein the puncture extends in a transverse direction.

9. The method according to claim 1, wherein the puncture extends at most partially around the shrink label.

10. An apparatus for making a shrink label for covering a receptacle from a strip of flexible tubular material, in particular for making the shrink label according to a method of making a shrink label for covering a receptacle from a strip of flexible tubular material, wherein the shrink label has a given length measured from a first end to a second end, being measured in the longitudinal direction of the strip, the method comprising:

puncturing the shrink label or the strip to form a puncture being spaced apart from the first end and from the second end, wherein the shrink label has a given length measured from a first end to a second end, being measured in the longitudinal direction of the strip, the apparatus comprising:

a puncturing means configured to puncture the shrink label or the strip to form a puncture being spaced apart from the ends of the shrink label.

11. The apparatus according to claim 10, further comprising an opening device for receiving a given length of the strip fed to the opening device, a free end of the strip being fed first, to open a region of the strip by separating opposing inner peripheral portions of the strip.

12. The apparatus according to claim 11, wherein:
the opening device comprises a recess configured to receive the puncturing means.

13. The apparatus according to claim 10, further comprising:
a cutting means configured to cut the shrink label from the strip, the strip having greater length than the given length of the shrink label.

14. The apparatus according to claim 10, further comprising:
a perforation means configured to form at least one perforation line, the at least one perforation line being in addition to the puncture.

15. The method according to claim 3, wherein the puncture has a central portion formed by a slit, and at least one end portion formed by perforations and extending from the central portion.

16. The method according to claim 3, wherein the puncture extends at most partially around the shrink label.

* * * * *